United States Patent Office 2,727,063
Patented Dec. 13, 1955

2,727,063
PROCESS FOR THE PREPARATION OF OPTICALLY ACTIVE AMINO PROPANE DIOLS

Robert Michel Jacob, Ablon-sur-Seine, and Jacques Georges Robert, Paris, France, assignors, by mesne assignments, to Parke, Davis & Company, Detroit, Mich., a corporation of Michigan No Drawing. Application February 23, 1951,
Serial No. 212,486

Claims priority, application France June 16, 1950

4 Claims. (Cl. 260—519)

This invention relates to a process for the preparation of optically active aminopropane diols.

This application is a continuation-in-part of our co-pending application Serial No. 212,483, filed February 23, 1951, now Patent No. 2,628,975 issued February 17, 1953.

It is the object of the present invention to provide a new and commercially useful process for the preparation of the optically active forms of erythro 2-amino-1-p-nitrophenylpropane 1:3-diol.

In the specification of co-pending application Serial No. 212,483, now Patent No. 2,628,975 issued February 17, 1953, there is described the preparation of the racemic erythro amido diol having the conventional formula:

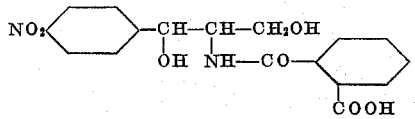

namely 2-o-carboxybenzamido-1 - p - nitrophenylpropane 1:3-diol by condensing p-nitrobenzaldehyde with α-phthalimidoacetaldehyde in the presence of a basic condensing agent to produce a reaction product having a melting point between 145° and 185° C., reducing that reaction product by methods known for the reduction of an aldehyde to an alcohol function without effect upon a nitro group and hydrolysing the product of reduction under alkaline conditions.

According to the present invention this racemic erythro amido diol is first resolved through the brucine salt and either or both of the optically active isomers thus separated is or are hydrolysed under acid conditions to form the corresponding amino diol isomer or isomers of the conventional formula:

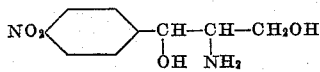

The separation via brucine salt is effected in excellent yield using conventional technique, preferably in aqueous isopropanol.

The hydrolysis is preferably effected by means of dilute hydrochloric acid.

The products of the invention are useful as intermediates in the production of certain antibiotics. In particular, the L-erythro amino diol is of considerable importance as an intermediate for the preparation of the therapeutically valuable amido diol known as chloramphenicol (see the specifications of co-pending applications Nos. 226,290 and 241,883).

The following non-limitative example shows how the invention may be put into practice.

Example 2.99 g. of racemic erythro 2-o-carboxybenzamido-1-p-nitrophenylpropane 1:3-diol and 3.27 g. of brucine are dissolved in 100 cc. of boiling isopropanol. While the solution is still hot, 73 cc. of water are added and the mixture is left to crystallise overnight in a refrigerator. The brucine salt which has crystallised is filtered, washed with aqueous isopropanol and dried in a desiccator over sulphuric acid. There is thus obtained 2.77 g. of a brucine salt of M. P. (cap.)=135°–140° C. The mother liquors are taken to dryness under reduced pressure and the residual resin is taken up with 50 cc. of boiling methanol. After having been left to cool, the product is filtered, washed with methanol and dried in a desiccator. 2.23 g. of a brucine salt of M. P. (cap.)=173°–176° C. are obtained.

1.92 g. of the brucine salt of M. P. 135°–140° C. is treated with 15 cc. of N/5 caustic soda solution and the brucine liberated is extracted with chloroform. The aqueous phase is then acidified with 3 cc. of 2 N sulphuric acid when there is obtained, L-erythro, 2-o-carboxybenzamido-1-p-nitrophenylpropane 1:3-diol with the following characteristics: melting point (cap.)=159.5° C., $(\alpha)_D^{29}=-25.6°$ (c.=8% in a solution of sodium bicarbonate). Hydrolysis of this acid by boiling for 5 hours with 2 N hydrochloric acid yields the dextrorotatory hydrochloride of L-erythro 2-amino-1-p-nitrophenylpropane 1:3-diol which melts (capillary tube) at about 200° C., and has the rotatory power $(\alpha)_D^{28}=+17.8°$ (c.=6% in water).

Treatment of the brucine salt of M. P. (cap) 173°–176° C. yields levorotatory D-erythro-2-amino-1-p-nitrophenylpropane 1:3-diol.

We claim:

1. Process for the preparation of an optically active isomer of erythro 2-o-carboxybenzamido-1-p-nitrophenylpropane-1,3-diol which comprises dissolving racemic erythro 2-o-carboxybenzamido-1-p - nitrophenylpropane-1,3-diol and brucine in an aqueous solvent thereby forming a solution of the brucine salts of the said racemic compound, submitting said solution to fractional crystallization to obtain the brucine salt of one of the separated optically active isomers of said compound, treating the brucine salt of said separated isomer with alkali to liberate brucine, separating the brucine, and acidifying the aqueous solution to obtain the optically active isomer of erythro 2-o-carboxybenzamido-1-p-nitrophenylpropane-1,3-diol.

2. Process according to claim 1 wherein the said optically active isomer is in the L-erythro form.

3. Process for the preparation of L-erythro 2-o-carboxybenzamido-1-p-nitrophenylpropane - 1,3 - diol which comprises dissolving DL-erythro 2-o-carboxybenzamido-1-p-nitrophenylpropane-1,3-diol and brucine in boiling isopropanol, adding water thereto, cooling to crystallize from the aqueous isopropanol the brucine salt of L-erythro 2-o-carboxybenzamido-1-p - nitrophenylpropane-1,3-diol, dissolving said brucine salt in aqueous alkali, extracting brucine with chloroform and acidifying the aqueous phase remaining after said reaction thereby obtaining L-erythro 2-o-carboxybenzamido-1-p-nitrophenylpropane-1,3-diol.

4. Process according to claim 3 in which the L-erythro 2-o-carboxybenzamido-1-p-nitrophenylpropane-1,3-diol is hydrolyzed with hydrochloric acid to obtain the dextrorotatory hydrochloride of L-erythro 2-amino-1-p-nitrophenylpropane-1,3-diol.

References Cited in the file of this patent
UNITED STATES PATENTS

| Number | Name | Date |
|---|---|---|
| 2,483,884 | Crooks et al. | Oct. 4, 1949 |
| 2,483,885 | Crooks et al. | Oct. 4, 1949 |
| 2,514,377 | Crooks et al. | July 11, 1950 |
| 2,586,661 | Jacob et al. | Feb. 19, 1952 |

OTHER REFERENCES

Karrer: Org. Chem., 3rd English ed., 1947, pp. 101–105, Elsevier Pub. Co., Inc., N. Y.